(12) United States Patent
Spurling et al.

(10) Patent No.: US 9,840,246 B2
(45) Date of Patent: Dec. 12, 2017

(54) VEHICLE COMPONENT IMPACT DEFLECTOR

(71) Applicant: Ford Global Technologies, LLC, Dearborn, MI (US)

(72) Inventors: Michael Spurling, Romford (GB); Daniel Meckenstock, Wuppertal (DE)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/181,852

(22) Filed: Jun. 14, 2016

(65) Prior Publication Data

US 2016/0368538 A1 Dec. 22, 2016

(30) Foreign Application Priority Data

Jun. 16, 2015 (DE) .................. 10 2015 211 008

(51) Int. Cl.
| | |
|---|---|
| *B60J 7/00* | (2006.01) |
| *B60T 17/08* | (2006.01) |
| *B60T 13/567* | (2006.01) |
| *F16B 37/14* | (2006.01) |

(52) U.S. Cl.
CPC .......... *B60T 17/088* (2013.01); *B60T 13/567* (2013.01); *F16B 37/14* (2013.01)

(58) Field of Classification Search
CPC .. B60R 21/01516; B60J 1/2008; B60K 11/08; B60K 13/02; B60N 2/002; B60P 3/08; G07B 15/063; B62D 1/28; G01S 13/931; G01C 21/28
USPC .................................................. 296/187.03
See application file for complete search history.

(56) References Cited

U.S. PATENT DOCUMENTS

| | | | |
|---|---|---|---|
| 2,174,598 A | 10/1939 | Quick et al. | |
| 3,244,079 A * | 4/1966 | Herrera ................. | B60T 17/083 92/63 |
| 3,495,675 A * | 2/1970 | Hass ..................... | B60R 21/013 180/274 |
| 3,705,742 A | 12/1972 | Lipscomb | |
| 3,879,617 A | 4/1975 | Faller | |
| 4,087,103 A * | 5/1978 | Smith ..................... | F16F 1/387 267/279 |
| 4,440,452 A * | 4/1984 | Burckhardt ............. | B60T 8/261 188/106 R |

(Continued)

FOREIGN PATENT DOCUMENTS

GB 2230493 A 10/1990

*Primary Examiner* — Kiran B Patel
(74) *Attorney, Agent, or Firm* — Burgess Law Office, PLLC; Raymond L. Coppiellie

(57) ABSTRACT

A deflection assembly for a vehicle including a vehicle component to be fastened or connected to a vehicle body. A connecting member extends through the vehicle component in an axial direction and is used for fastening the vehicle component to the vehicle body. A fastener is arranged on the connecting member axially in front of the vehicle component. To optimize a deformation zone of the motor vehicle a deflection element is arranged on the connecting rod axially in front of the nut. The deflection element having, in one disclosed example, a cross-section that increases at least in sections in axial direction towards the vehicle component. In addition, the deflection element may include an outer surface extending obliquely to the axial direction of the connecting member.

15 Claims, 3 Drawing Sheets

(56) References Cited

U.S. PATENT DOCUMENTS

| | | | | |
|---|---|---|---|---|
| 4,632,014 | A * | 12/1986 | Endo | B60T 13/57 60/547.1 |
| 5,410,880 | A * | 5/1995 | Schluter | B60T 13/5675 60/547.1 |
| 5,680,807 | A * | 10/1997 | Wagner | B60T 13/569 91/533 |
| 5,765,468 | A * | 6/1998 | Gautier | B60T 13/5675 91/376 R |
| 5,802,852 | A * | 9/1998 | Harbaugh | B60T 13/563 60/547.1 |
| 5,890,358 | A | 4/1999 | Verbo et al. | |
| 5,927,821 | A * | 7/1999 | Bauer | B60R 21/013 180/271 |
| 6,079,207 | A | 6/2000 | Stadler et al. | |
| 6,112,616 | A * | 9/2000 | Schonlau | B60R 21/09 180/274 |
| 6,186,050 | B1 * | 2/2001 | Verbo | B60T 13/5675 92/169.3 |
| 6,189,437 | B1 * | 2/2001 | Morlan | B60T 13/5675 92/165 PR |
| 6,314,865 | B1 * | 11/2001 | Henein | B60T 13/5675 92/169.3 |
| 6,422,124 | B1 * | 7/2002 | Schonlau | B60T 8/3275 91/369.2 |
| 6,516,702 | B1 * | 2/2003 | Stephane | B60T 13/567 303/114.3 |
| 7,506,715 | B2 | 3/2009 | Averdiek et al. | |
| 7,651,107 | B1 * | 1/2010 | Chapin | B60G 11/12 267/192 |
| 2005/0166748 | A1 * | 8/2005 | Schramm | B60T 13/575 91/376 R |
| 2009/0269552 | A1 * | 10/2009 | Foldager | F41H 5/013 428/172 |

\* cited by examiner

VEHICLE COMPONENT IMPACT DEFLECTOR

CROSS-REFERENCE TO RELATED APPLICATIONS

Not Applicable.

BACKGROUND OF THE INVENTION

1. Field of the Invention

The present invention relates to an assembly for a motor vehicle, and more specifically to an assembly including a deflection element.

2. Description of Related Art

Managing deflection and movement of various vehicle components in a collision is one aspect of maintaining vehicle crashworthiness. Even in times of progressive restraint systems such as a belt tensioner or airbag, which are triggered on or, if applicable, immediately before an impact, it is desired to manage the deformation zone. The deformation zone is the region of the vehicle deformed on a collision, and therefore receiving energy. An effective deformation zone must not be too soft, because the deformation process reduces too little energy and allowing deformation of the passenger compartment. Rigid and stable components lead to higher, and under certain circumstances unacceptable accelerations, which act on the occupants. For example, the engine block, as a non-deformable body, likewise reduces the energy absorption through structural deformation. The deformation zone can extend over the front, the rear, and both sides of the vehicle.

Forming a reduced deformation zone in the front region of modern vehicles depends on various factors. On the one hand, owing to the increasingly more strict requirements regarding emissions and fuel consumption, the engine, the transmission and additional components take up an increasing amount of space; these components or respective assemblies are generally not deformable. Further, the size of the batteries is constantly increasing due to the growing number of electrical/electronic consumers. There is an increasing tendency to reduce the length of the structural vehicle front for reasons of weight and design. With the same energy input and structure, there follows a more intensive deformation of the firewall (i.e. the wall between engine and occupant), which consequently can shift the steering column and pedals toward the occupant.

A further restriction of the deformation zone results through brake force boosters. In brake systems with a brake force booster, normally the main brake cylinder forms an assembly with the brake force booster. The housing of the brake force booster is generally too weak to receive the forces occurring on the part of the main cylinder. The main cylinder is fastened on the vehicle side with one or more connecting members (also designated as connecting rods or tie rods), which are guided through the brake force booster. Each connecting rod forms in its axial direction a rigid component within the engine compartment, which typically does not deform and is directed toward the occupants. It has been found that deformation of the driver's compartment near the firewall at the height of the steering column originates principally from an interaction, i.e. a collision, either of the engine block, gear components, or the battery with a connecting rod of the brake force booster. However, it is difficult or respectively almost impossible, to prevent a contact of the said components with the connecting rod in a collision, without distinctly reducing the size (length/width) of the interacting components. Similar problems can also arise in other vehicle assemblies, for example tank connecting bolts during a rear impact or an interaction of fuel lines with bolts securing assemblies in a side impact, in which the axial rigidity of a connecting rod impairs the deformation behavior in a collision. They are not restricted to the front of the vehicle.

SUMMARY OF THE INVENTION

An assembly for a motor vehicle including a vehicle component and a connecting member extending through the vehicle component in an axial direction wherein a fastener arranged on the connecting member axially in front of the vehicle component secures the vehicle component to the vehicle. A deflection element is secured to the connecting member, axially in front of the fastener, with the deflection element having a surface extending obliquely to the axial direction of the connecting member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
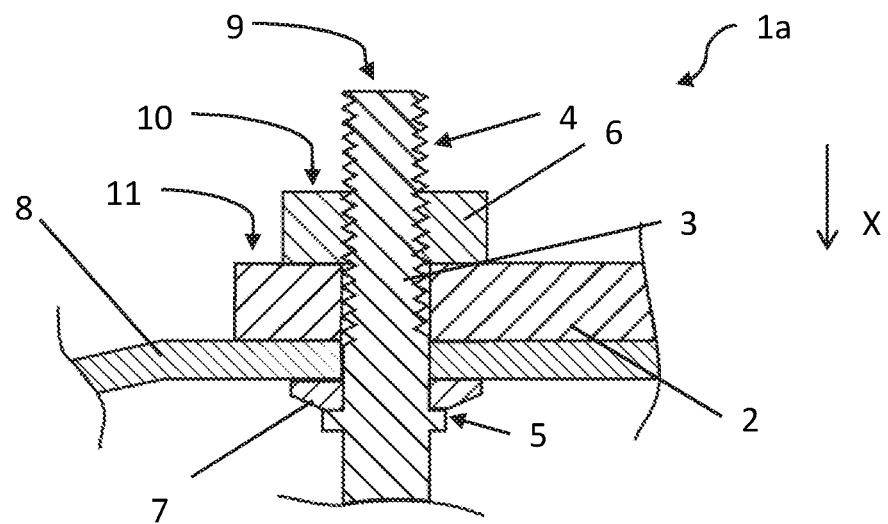
FIG. 1A illustrates a sectional view of an assembly according to the prior art.

The following description of the preferred embodiment(s) is merely exemplary in nature and is in no way intended to limit the invention, its application, or uses.

In the different figures, the same parts are always given the same reference numbers, for which reason these are generally also only described once.

FIG. 1 shows a sectional view of an assembly 1a, more precisely a brake force booster assembly, according to the prior art. As illustrated, a cylinder base 2 of a main brake cylinder is fastened with a connecting rod 3 on a sufficiently stable mount (not illustrated) of a motor vehicle. The connecting rod 3, which extends along an axial direction X, is guided through the housing 8 of a brake force booster and through the cylinder base 2. In the present example, the axial direction of the connecting rod 3 coincides with the X-axis (longitudinal axis) of the motor vehicle. In axial direction X and in front of the cylinder base 2a nut 6 is screwed onto an external thread 4 of the connecting rod 3, whereby forces acting on the main brake cylinder are transferred via the nut 6 to the connecting rod 3. In axial direction and behind the housing 8a collar 5 is formed on the connecting rod 3. Between the collar 5 and the housing 8, a sealing ring 7 (illustrated in a simplified manner) is arranged. The collar 5 and the sealing ring 7 serve for securing against axial displacement, ensuring that an underpressure can be generated within the housing 8, which is essential for the function of the brake force booster.

Figure 1B:
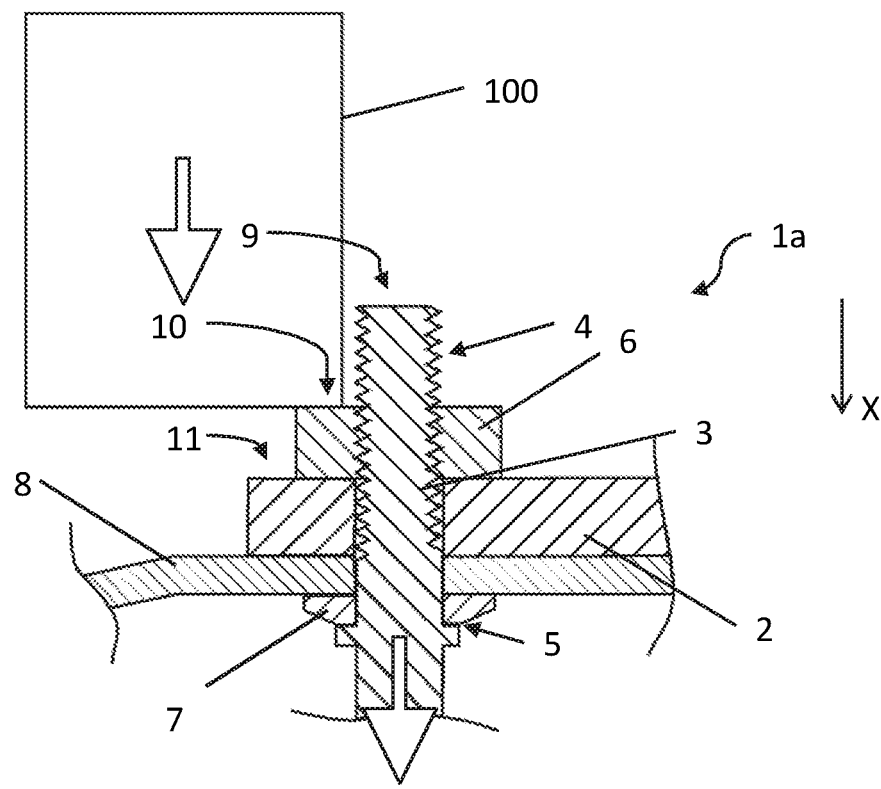
FIG. 1B shows the assembly of FIG. 1A and an impacting object.

The connecting rod 3, the nut 6, and the cylinder base 2 have face surfaces 9, 10, 11 running perpendicularly to the axial direction X. Taking into account that the connecting rod 3 does not deform in axial direction X and therefore receives little or no energy in a collision. FIG. 1B, besides the assembly of FIG. 1a, also shows, in highly diagrammatic form, an impacting component 100, e.g. an engine block, a gear component, or a battery of the vehicle. As illustrated by the arrow, the component 100 moves in axial direction X towards the assembly 1a and impacts onto the face surface 10 running perpendicularly to its direction of movement. If applicable, it could also impact onto one of the other face surfaces 9, 11. The forces in axial direction X are passed on to the connecting rod 3. Since the connecting rod 3 is generally not deformable in the X direction, it may be pressed axially through the dash panel toward the driver's area.

As illustrated in the following example of the present invention, the assembly includes a vehicle component fastened or connected to a vehicle using a connecting member such as a connecting rod, extending through the vehicle component. The connecting member extends in an axial direction with a fastener or nut arranged on the connecting member axially in front of the vehicle component. The vehicle component may be constructed, as shown, in a plate-like or flange-like manner. It can have a face surface running perpendicularly to the axial direction. Typically, the connecting rod member securing the vehicle component on another component extends in an axial direction. Such connecting members can be guided through a component or an assembly too weak to carry the vehicle component and can be fastened to a structurally stronger component, whereby in particular a fastening of the vehicle component to the chassis or to the body can be realized. Usually, the connecting member serves for the vehicle-side fastening of the vehicle component.

Figure 2A:
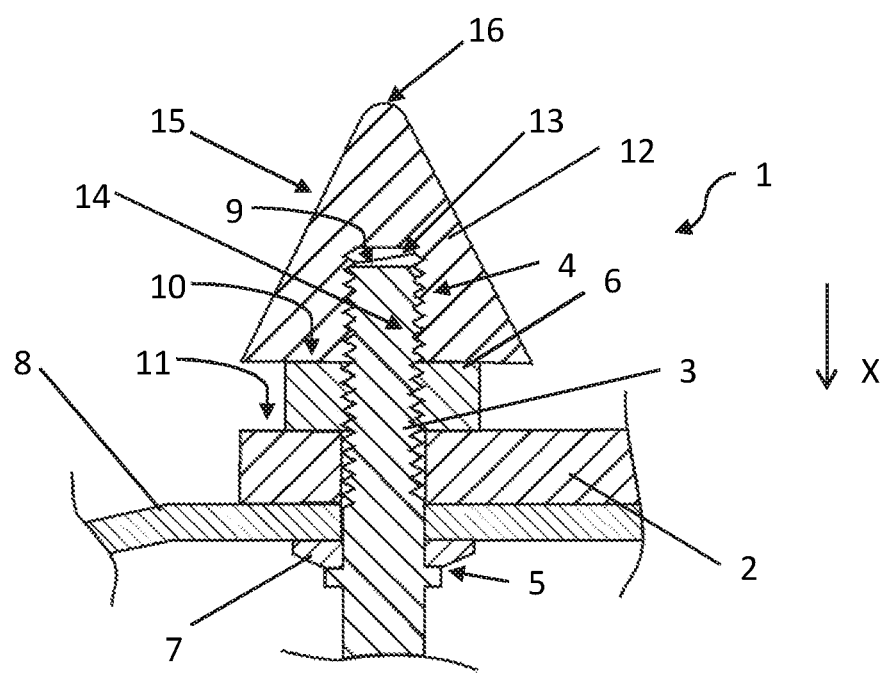
FIG. 2A illustrates a sectional view of an assembly according to one example of the present invention.
Figure 2B:
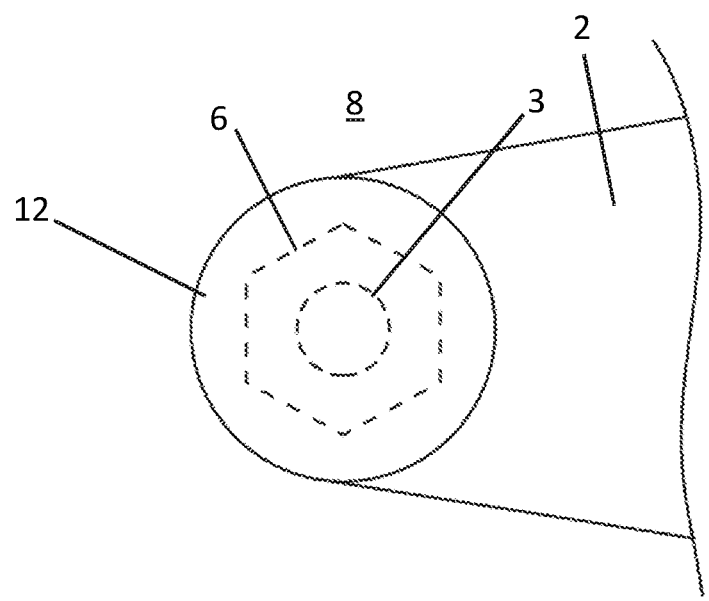
FIG. 2B is an axial view of the assembly of FIG. 2A.
Figure 2C:
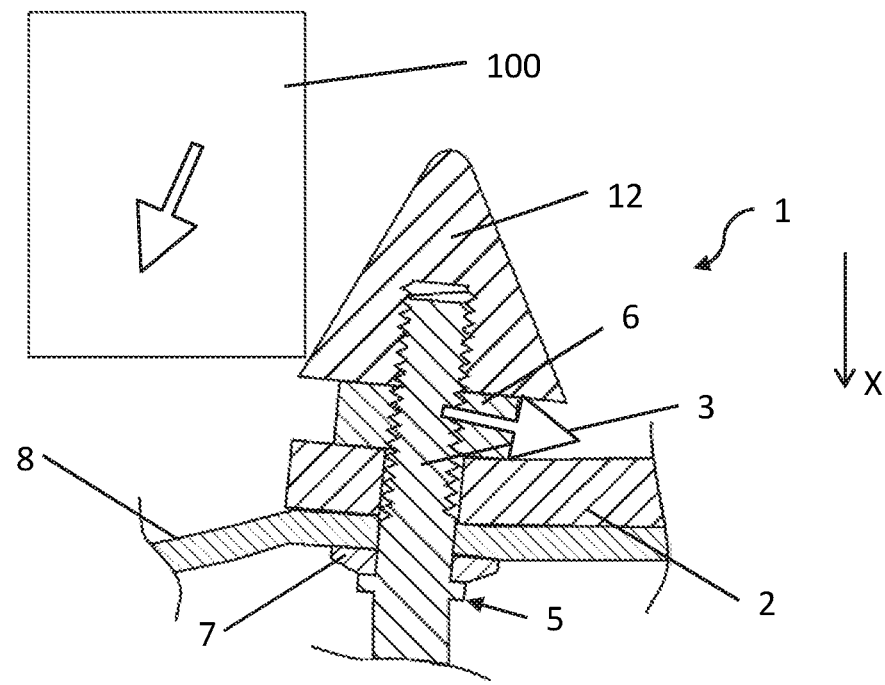
FIG. 2C is a sectional view of the assembly of FIG. 2A and an impacting object.
Figure 3:
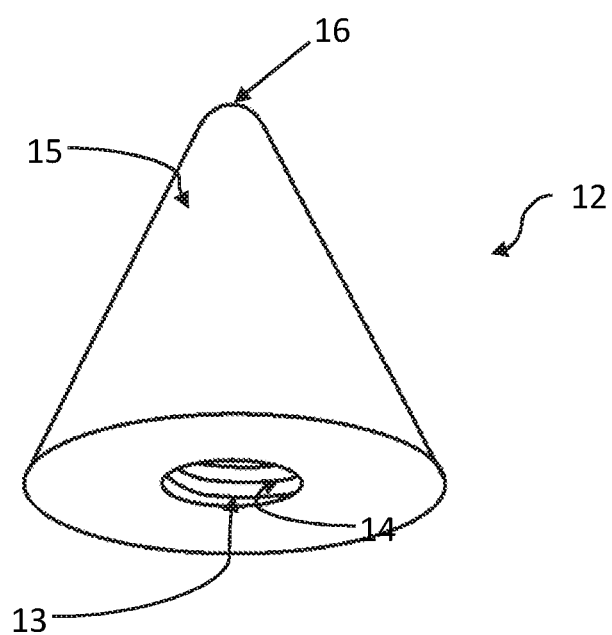
FIG. 3 is a perspective illustration of the deflection element of the assembly of FIGS. 2A and 2B.

One example of the present invention is illustrated in FIGS. 2A-2C. Features configured predominantly identically to the assembly 1a illustrated in FIGS. 1A and 1B are not described again. A deflection element 12 is attached to the connecting member 3, in the present example screwed onto the external thread 4 of the connecting member 3. As shown in FIG. 3, the deflection element 12, produced from steel, is constructed roughly in a cone shape and includes an axially extending bore 13 with an internal thread 14. In an assembled state, the internal thread 14 engages with the external thread 4 of the connecting member 3. As seen in FIG. 2A, the deflection element 12 is arranged axially in front of the nut 6, wherein a frustum-like surface or outer shell 15 is inclined at an angle of approximately 30° regarding the axial direction X. The surface or outer shell 15 continues into an end region 16 of the deflection element 12. The end region 16 rounded approximately in the manner of a spherical segment. As illustrated in axial view in FIG. 2B, the dimensions of the deflection element 12 are selected whereby it projects in radial direction beyond the nut 6 and covers, in sections, the cylinder base 2. The face surfaces 9 and 10 are covered and the face surface 11 is covered at least partially.

Referring to FIG. 2C, illustrating an impacting component 100, it should be understood that the component 100 does not impact the face surfaces 9, 10, 11 running perpendicularly to its original direction of movement, but rather the oblique surface or outer shell 15. The inclination of the oblique surface or outer shell 15 produces a force component running transversely to the axial direction X, thereby laterally deflecting the component 100 as indicated by the movement arrow. Deflecting the component 100 reduces the chances of a direct collision of the component 100 with the connecting rod 3, the nut 6, or the cylinder base 2 whereby instead the component 100 impacts, if applicable, on the housing 8, which is substantially easier to deform and therefore forms an effective component of the deformation zone.

While the force of the component 100 is deflected, the corresponding counter-force on the deflection element 12, connected to the connecting member 3, leads to the connecting member 3 being deflected. While the connecting rod 3 is practically non-deformable in axial direction X, it deflects to an appreciable extent transversely to the axial direction X through the forces occurring in the case of a collision, whereby energy is received and dissipated.

The deflection involves a deformation of the housing 8 and if applicable of other components such the cylinder base 2. In the present example, the component 100 impacts directly onto the surface or outer shell 15. First contact could also occur in the rounded end region 16. The rounded end region 16 generally prevents the component 100 from catching. Normally, the component 100 slides off the end region 16 and further laterally over the surface or outer shell 15.

In the disclosed example, the longitudinal axis of the connecting member extends in an axial direction parallel to in the direction of the load application. The also radial and tangential directions are based on the axial direction. For front and rear impact, the axial direction typically coincides with the X-axis of the vehicle, but can also coincide with the Y-axis of the vehicle in the case of a lateral crash. The installation position of the connecting member can deviate from the vehicle main axes depending on the practical installation position, wherein the contact surfaces remain. The nut, screwed tightly via an external thread present on the connecting member, axially secures the vehicle component on the connecting member. As illustrated, the nut is arranged in axial direction in front of the vehicle component, wherein the designation "in front" generally serves to describe a sequence of the components in axial direction and is not to be construed in a restrictive manner.

The deflection element 12 can be integrated into a multiplicity of assemblies. The effectiveness of the deformation zone is increased, without one of the other components having to be altered regarding its size or position.

As disclosed, the deflection element 12 is arranged on the connecting member 3, axially in front of the nut 6 whereby the cross-section of the deflection element 12 increases at least in sections in axial direction towards the vehicle component. The deflection element becomes wider, at least in sections, towards the vehicle component. The increase of the cross-section should take place continuously, although smaller jumps or steps are possible. The function of the deflection element is to, at least partially, prevent, in the case of a collision, direct impact of another component, for example the engine block, a gear component, or the battery, onto the nut 6, the connecting member 3, and/or the vehicle component. Moreover, the disclosed example reduces the possibility of squeezing or jamming a component, for example of a fuel line between these rigid assemblies.

Instead, the component impacts on the deflection element 12 and through the increasing cross-section increasing towards the vehicle component, a radial and/or tangential deflection of the impacting component and of the deflection element (and therefore of the connecting member) with respect to one another takes place. With respect to the reference system of the vehicle, the impacting component, the deflection element, or both, can undergo a deflection.

According to the disclosed embodiment, the deflection element 12 has an outer surface or shell running obliquely to the axial direction. The outer surface runs obliquely, i.e. neither along the axial direction nor perpendicularly thereto. If another component impacts in axial direction on oblique outer surface, the alignment thereof generates a force component transversely to the axial direction. The component laterally deflects whereby the force component can lead to a deflection of the connecting member 3. The outer surface generally forms only a portion of the entire surface of the deflection element. It can be constructed circumferentially in tangential direction or respectively several such faces can adjoin one another circumferentially in tangential direction. The surface can have a constant or variable inclination with respect to the axial direction.

The deflection element prevents impact on the face surfaces of the connecting member 3, the nut 6, and/or the vehicle component, running substantially perpendicularly to the axial direction. An impact resulting in an axial force occurring in the connecting member, which as set forth above is generally not deformable in an axial direction. As further explained below, the face surfaces of the respective connecting member 3, the nut 6, and/or the vehicle component, can be shielded more or less by the deflection element 12. Ideally, the impacting component slides off laterally from the deflection element 12 and can therefore impact e.g. onto an element which is substantially more easily deformable. Here, also, a force component occurs running perpendicularly to the axial direction, whereby the force component acts on the connecting member deflecting it laterally, if applicable. Better energy absorption is possible through deformation work, whereby the efficiency of the deformation zone is improved. Partially preventing application of an axial load in the connecting member achieves an increase in efficiency without having to alter one of the components, in particular without having to make it smaller.

The deflection element 12 may be integrated into a plurality of systems, in which, as described, a combination of connecting members and fasteners are used, to fasten a vehicle component. The deflection element 12 has flexibly and can be integrated, if applicable, in a late planning stage, if it appears there is a risk of an axial impact of a component onto a connecting member, fastener, or a vehicle component fastened therewith. The deflection element itself normally requires only a little additional installation space and can therefore be easily integrated.

As an appreciable deformation of the deflection element 12 is, rather, undesirable, its stability should correspond, at least approximately, to that of the connecting member or respectively that of an impacting object in a collision (engine, gear component etc.). Metals, in particular steel, are suitable materials; other materials, such as for example ceramic, could also be used. Furthermore, if applicable, a surface coating can be provided, by which the friction is reduced, thereby promoting the sliding off of an impacting object.

The vehicle component may be a cylinder base of a main brake cylinder, and the connecting rod is provided for the vehicle-side fastening of the main brake cylinder. In this case, the assembly can also be designated as a "brake force booster assembly," because it is to be associated with the brake force booster including the related main brake cylinder. Both individual and tandem brake force boosters are contemplated.

The cylinder base may be part of the main brake cylinder, which in the assembled state, faces the housing of the brake force booster and (if applicable with interposition of washers or similar) is arranged on the housing. It may be constructed in particular as a flange. In many cases, it is constructed in one piece with parts of the cylinder housing, wherein the cylinder base can also be considered as base section of the cylinder housing. The cylinder base does not form a distinct component here, but rather a part of a component. However, configurations also exist in which it is connected with the cylinder housing as a separately produced component.

In this embodiment, the connecting member or rod fastens the main brake cylinder on the vehicle side to a sufficiently stable component. The connecting member extends, in an installed state, through the housing of the brake force booster, which is too weak to receive the forces that the connection to the main brake cylinder entails. On the vehicle side, the connecting rod can be fastened by screwing or other types of connection known according to the prior art. In this embodiment, the impacting component ideally slides laterally off from the deflection element and impacts onto the substantially more easily deformable housing of the brake force booster. Typically, the nut, in installed state, is arranged closer to the front side of the vehicle, i.e. "in front of" the cylinder base. The entire complex of brake force booster and main brake cylinder can comprise several such connecting rods and nuts, via which several cylinder bases (which depending on the embodiment can also be a single cylinder base) are secured on the vehicle side.

It will be understood that the brake force booster assembly can also comprise further elements, in particular those associated with the actual brake force booster, for example the housing thereof, against which the cylinder base lies in installed state.

Advantageously, the said outer surface 15 of the deflection element 12 is inclined at an angle of between 20° and 70° to the axial direction. With smaller angles, the deflection effect is small or respectively the deflection element must be long in axial direction, to achieve an appreciable deflection. With larger angles, the deflection element forms a face surface similar to those provided through the connecting member, the nut, or the vehicle component (e.g. the cylinder base) which is to be fastened whereby the deflection function can be greatly impaired.

According to an advantageous embodiment, the deflection element is a cone-shaped section. Here, "cone-shaped" also includes "cone frustum-shaped." The section having a tangentially circumferential surface with constant inclination to its axial direction. Modifications are also possible, in which the inclination increases or else decreases axially forward (i.e. towards the end facing away from the vehicle component). It is possible to vary these or other embodiments in that the surface has grooves or respectively notches, which extend in axial and/or radial direction. With this alignment, a sliding movement of an axially impacting component along the deflection element is scarcely impaired, while reducing the weight of the deflection element.

While a cone shape offers the greatest symmetry and therefore the greatest flexibility regarding the position in which another component impacts onto the deflection element, other shapes are also conceivable, for example a tetrahedron shape, pyramid shape (with four, five or more side faces) or even a roof shape. Where the impacting of a component can only take place at a particular location or respectively the deflecting is to take place in a targeted manner in a particular direction.

Preferably, the deflection element projects at least in sections in radial direction beyond the nut; ensuring that, at least in the section concerned, an axially impacting component is deflected away from the nut. Owing to the general shape of the deflection element, the latter can project beyond the nut in particular at its end facing the vehicle component. In this embodiment, it is further preferred that the deflection element projects tangentially circumferentially everywhere beyond the nut. The deflection element forms a cap or shield, which covers the nut. As a variant, it is also conceivable that the edge of the deflection element extends in axial direction into the region of the nut, so the nut is arranged at least partially within the deflection element.

It is preferred that the deflection element at least in sections covers the vehicle component, for example the cylinder base, in radial direction. The function similar to as described above with respect to the nut, namely that an impacting component is reliably deflected from the vehicle component. On the side on which the cylinder base continues into the actual body of the cylinder, it is not possible to completely cover the cylinder base, which stands in the way of a tangentially completely circumferential covering as in the case of the nut. Similar configurations may also exist with other vehicle components to be fastened. In some embodiments, the deflection element may cover the vehicle component in radial direction and also project beyond.

While the lateral surfaces of the deflection element preferably run obliquely to the axial direction, the axially foremost part, in so far as it is small in terms of area, can if applicable, extend perpendicularly to the axial direction. This applies in particular if, owing to the arrangement of the other components, an impacting in this region can be ruled out. In such a case, even an axially extending running recess could be included. It is conceivable that the deflection element tapers at the front, which is the case, for example, in an ideal pyramid or cone shape. According to another preferred embodiment, the deflection element is rounded at a front end. This shape, even with an impact in this region, initiates a sliding off to the side. The rounded part can be configured, for example, as a spherical segment.

Various possibilities exist regarding the fastening of the deflection element 12 on the connecting member or rod 3. The deflection element 12 has a bore or recess 13, in which the connecting member 3 is received. The deflection element 12 may also, for example, be shrunk on, pressed on, glued on, or welded on. However, the external thread—which is present—of the connecting member or rod, on which the nut sits, may be used for fastening. Here, the deflection element 12 has an internal thread that engages with the external thread of the connecting rod. The deflection element is screwed or threaded onto the connecting rod.

Various configurations are conceivable to be able to rotate the deflection element 12 with a tool. A mount for a screwing tool (hexagon socket, torx, etc.) can be introduced in axial direction into the front/tip of the deflection element; two parallel flanks can be milled laterally onto the deflection element, which permit the use of a screw wrench for screwing; or a fixed connection (for example welding) with a nut or nut-like component positioned between the component to be fastened and the deflection element are conceivable. The internal thread in nut and deflection element must be cut consistently, with the nut serving as a contact point for the tool for rotating the deflection element. In the latter case, the nut and deflection element form a single-piece or single-part component.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly for a motor vehicle comprising:
a vehicle component;
a connecting rod extending through the vehicle component in an axial direction;
a nut arranged on the connecting rod axially in front of the vehicle component; and
a deflection element on the connecting rod, axially in front of the nut, said deflection element having a cross-section that increases in axial direction (X) towards the vehicle component.

2. The assembly of claim 1 wherein said deflection element has an outer surface extending obliquely to the axial direction.

3. The assembly of claim 1 wherein said vehicle component is a cylinder base of a main brake cylinder and the connecting rod fastens the main brake cylinder to a portion of a vehicle.

4. The assembly of claim 1 wherein said deflection element has an outer surface inclined at an angle of between 20° and 70° to the axial direction of the connecting rod.

5. The assembly of claim 1 wherein the deflection element includes a cone-shaped section.

6. The assembly of claim 1 wherein at least a portion of the deflection element projects in radial direction beyond the nut.

7. The assembly of claim 1 wherein the deflection element covers, in the radial direction a portion of the vehicle component.

8. The assembly of claim 1 wherein the deflection element is rounded at a front end.

9. The assembly of claim 1 wherein the deflection element has an internal thread into which an external thread of the connecting rod engages.

10. An assembly for a motor vehicle comprising:
a vehicle component;
a connecting member extending through the vehicle component in an axial direction;
a fastener arranged on the connecting member axially in front of the vehicle component; and
a deflection element secured to the connecting member, axially in front of the fastener, said deflection element having a surface extending obliquely to the axial direction.

11. The assembly of claim 10 wherein said surface is inclined at an angle of between 20° and 70° to the axial direction.

12. The assembly of claim 10 wherein the deflection element includes a cone-shaped section.

13. The assembly of claim 12 wherein at least a portion of the deflection element projects in radial direction beyond the fastener; and
at least a portion of the deflection element projects in the radial direction beyond a portion of the vehicle component.

14. The assembly of claim 10 wherein the deflection element is rounded at a front end.

15. The assembly of claim 10 wherein the deflection element has an internal thread into which an external thread of the connecting member engages.

* * * * *